United States Patent
Yabuta et al.

(10) Patent No.: US 8,024,006 B2
(45) Date of Patent: Sep. 20, 2011

(54) MOBILE TERMINAL WITH CELLULAR AND BROADCAST RECEPTION, AUDIO MUTING AND CLOSED CAPTIONING

(75) Inventors: Tetsutaka Yabuta, Osaka (JP); Masaki Kanbe, Gifu (JP)

(73) Assignee: Kyocera Corporation, Kyoto (JP)

( * ) Notice: Subject to any disclaimer, the term of this patent is extended or adjusted under 35 U.S.C. 154(b) by 732 days.

(21) Appl. No.: 12/089,952

(22) PCT Filed: Nov. 27, 2006

(86) PCT No.: PCT/JP2006/323619
§ 371 (c)(1),
(2), (4) Date: Apr. 11, 2008

(87) PCT Pub. No.: WO2007/063810
PCT Pub. Date: Jun. 7, 2007

(65) Prior Publication Data
US 2009/0231489 A1 Sep. 17, 2009

(30) Foreign Application Priority Data
Nov. 29, 2005 (JP) .................................. 2005-344510

(51) Int. Cl.
*H04M 1/00* (2006.01)
*H04B 1/38* (2006.01)

(52) U.S. Cl. ......... 455/566; 455/132; 704/271; 725/136
(58) Field of Classification Search .................... 455/88, 455/552.1, 556.1, 132, 149, 218, 566; 348/632; 704/271; 725/136–137; 715/865
See application file for complete search history.

(56) References Cited

U.S. PATENT DOCUMENTS
7,633,516 B2 * 12/2009 Tamura ...................... 348/14.01
7,800,701 B2 * 9/2010 Chen et al. .................... 348/731

FOREIGN PATENT DOCUMENTS
JP 2004-110338 4/2004
JP 2004-110388 A 4/2004
JP 2005-203863 A 7/2005

OTHER PUBLICATIONS

Softbank Mobile Corp., Basic operation manual for V603T, Jan. 2005, 1st version, p. 6-4, http://broadband.mb.softbank.jp/mb/japanese/mysoftbank/crm/online_manual/pdf/v603t/v603t_bas.pdf.
Notification of Reasons for Refusal, from Japanese Patent Application No. 2005-344510, mailed on Dec. 8, 2009.
V603T Kihon Sosa Hen; Softbank Mobile Corp., Jan. 2005; Heisei 19 Nen 2 Gatsu 13 Nichi; Cited ISR.
International Search Report of PCT/JP2006/323619, date of mailing Feb. 20, 2007.
Office Action from Chinese Patent Application No. 200680044311.1, mailed on Nov. 2, 2010.

* cited by examiner

*Primary Examiner* — Christian Hannon
(74) *Attorney, Agent, or Firm* — Morrison & Foerster LLP

(57) ABSTRACT

The present invention provides a mobile communication terminal having broadcast reception function, capable of preventing occurrence of a situation in which sound comes out due to the activation of a television function even though the phone's silent mode is set. When the phone's silent mode is set in a television watching state, a CPU 1 determines that it is a television silent mode. Similarly, also when an ON operation is performed on a television function activation key in a state where the phone's silent mode is set, the CPU 1 determines that it is the television silent mode. When the CPU 1 determines that it is the television silent mode, the CPU 1 mutes television sound.

14 Claims, 3 Drawing Sheets

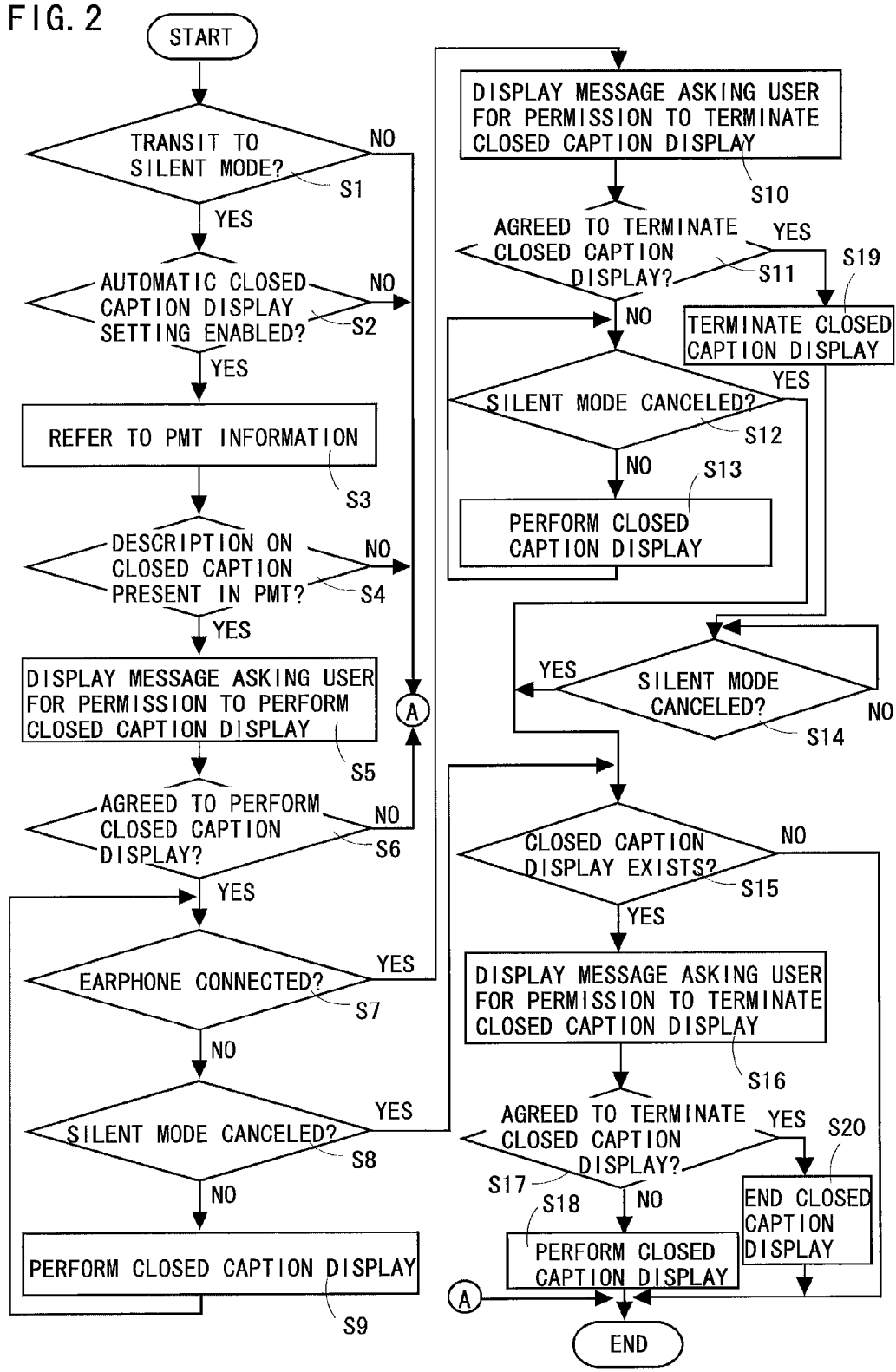

IN NORMAL TIMES

ON AUDIO MUTE
(IN PHONE'S SILENT MODE)

100# MOBILE TERMINAL WITH CELLULAR AND BROADCAST RECEPTION, AUDIO MUTING AND CLOSED CAPTIONING

TECHNICAL FIELD

The present invention relates to a mobile communication terminal having broadcast reception function that includes the function of receiving a television broadcast and the function of making a call by radio.

BACKGROUND ART

In recent years, among mobile phone devices having a television broadcast receiving function, there is one that allows a user to comfortably view television broadcasts (see Japanese Laid-Open Patent Publication No. 2005-167909).

DISCLOSURE OF THE INVENTION

Problems to be Solved by the Invention

In such a mobile phone device having a television broadcast receiving function, a television (TV) function section and a mobile phone function section are controlled substantially independently of each other; thus, for example, a situation may occur in which even when the phone's silent mode is set to prevent sound from coming out, sound comes out because a TV function is activated.

In view of the above circumstances, it is an aspect of the present invention to provide a mobile communication terminal having broadcast reception function that prevents occurrence of a situation in which, despite the phone's silent mode being set, sound comes out because a TV function is activated, and that further allows a user to watch television as comfortable as possible even when such a prevention process is executed.

Means for Solving the Problems

In order to solve the above-described problem, a mobile communication terminal having broadcast reception function according to the present invention includes: a broadcast receiving function section for receiving a television broadcast; a wireless telephone function section for making a call by radio; and a controller that controls the function sections and performs display control on a display, wherein the broadcast receiving function section has an audio mute function, the wireless telephone function section has a silent mode function, and when the silent mode is performed in the wireless telephone function section, the controller causes the broadcast receiving function section to perform the audio mute (hereinafter referred to as a first configuration in this section).

According to the first configuration, when the silent mode function of the wireless telephone function section is executed, an audio mute mode is performed in the broadcast receiving function section, and thus, it is possible to prevent occurrence of a situation in which despite the phone's silent mode being set, sound comes out because a TV function is activated.

In the mobile communication terminal having broadcast reception function according to the first configuration, the controller may perform control to cause, when the silent mode is performed in the wireless telephone function section, the broadcast receiving function section to perform the audio mute, in the case where the control is permitted by a user setting (hereinafter referred to as a second configuration in this section).

In the mobile communication terminal having broadcast reception function according to the first or second configuration, the broadcast receiving function section may be configured to receive a digital broadcast and to perform closed caption display, and the controller may cause the broadcast receiving function section to perform the closed caption display when causing the broadcast receiving function section to perform the audio mute. In this configuration, the closed caption display may be performed when the display is permitted by a user setting.

In the mobile communication terminal having broadcast reception function according to the first or second configuration, the broadcast receiving function section may be configured to receive a digital broadcast and to perform closed caption display, the controller may display a message asking for permission to perform the closed caption display before causing the broadcast receiving function section to perform the audio mute, and when a user performs an operation to agree to the closed caption display, the controller may cause the broadcast receiving function section to perform the closed caption display, and when the user performs an operation to disagree to the closed caption display, the controller may not cause the broadcast receiving function section to perform the closed caption display.

In each of the configurations in which the closed caption display can be performed, for enabling a user to distinguish between closed caption display resulting from the audio mute and normal closed caption display, the controller may perform icon display or differentiating the display mode of a closed caption display portion between the closed caption display resulting from the audio mute and the normal closed caption display.

The mobile communication terminal having broadcast reception function according to the first or second configuration may further include an earphone connector. When an earphone is connected or when an earphone is being connected, the controller may terminate the mode of the audio mute and cause sound to be outputted from the earphone.

Each of the aforementioned configurations in which the closed caption display can be performed may further include an earphone connector. When an earphone is connected or when an earphone is being connected, the controller may terminate the mode of the audio mute and cause sound to be outputted from the earphone, and terminate the mode of the closed caption display adopted based on the audio mute.

Alternatively, each of the aforementioned configurations in which the closed caption display can be performed may further include an earphone connector. When an earphone is connected or when an earphone is being connected, the controller may terminate the mode of the audio mute and cause sound to be outputted from the earphone, and display a message asking for permission to terminate the mode of the closed caption display adopted based on the audio mute. Furthermore, when a user performs an operation to agree to terminate the mode of the closed caption display, then the controller may terminate the mode of the closed caption display, and when the user performs an operation to disagree to terminate the mode of the closed caption display, then the controller may continue the mode of the closed caption display.

The configuration in which the distinguished display is performed due to the audio mute may further include an earphone connector. When an earphone is connected or when an earphone is being connected, the controller may terminate the mode of the audio mute and cause sound to be outputted from the earphone, and display a message asking for permission to terminate the mode of the closed caption display adopted based on the audio mute. Furthermore, when a user performs an operation to agree to terminate the mode of the closed caption display, then the controller may terminate the mode of the closed caption display, and when the user performs an operation to disagree to terminate the mode of the closed caption display, then the controller may continue the mode of the closed caption display and return, when continuing the mode of the closed caption display, display in which the distinction is made to display in which the distinction is not made.

In the portable communication terminals with a broadcast receiving function of these configurations, not only when the silent mode of the wireless telephone function section is terminated but also when an independent operation to terminate the audio mute is performed, the controller may terminate the mode of the audio mute and return a state resulting from the audio mute to a state before the audio mute is performed.

Effect of the Invention

According to the present invention, advantageous effects are provided that the occurrence of a situation is prevented in which, despite the phone's silent mode being set, sound comes out because a TV function is activated, and furthermore, even when such a prevention process is executed, a user can watch television as comfortable as possible.

BEST MODE FOR CARRYING OUT THE INVENTION

A mobile communication terminal having broadcast reception function according to an embodiment of the present invention will be described below with reference to FIGS. 1 to 3. Note that a mobile phone with TV is exemplified here as the mobile communication terminal having broadcast reception function.

FIG. 1 is a block diagram showing a mobile phone with TV 10. The mobile phone with TV 10 includes a digital broadcast receiving section 20 and a telephone function section 30. The telephone function section 30 includes a radio processing circuit 31, a signal processing circuit 32, an A/D (analog-to-digital)-D/A (digital-to-analog) converting section 33, a microphone 34, and a speaker 35. The radio processing circuit 31 performs a transmission and reception process of sound and data and predetermined protocol processes (processes for transmission and reception) to a base station. While a signal received in a telephone process is provided to the speaker 35 through the radio processing circuit 31, the signal processing circuit 32, and the D/A converting section of the A/D-D/A converting section 33, a voice uttered from a user is converted into an audio signal by the microphone 34 and the audio signal is sent out through the A/D converting section of the A/D-D/A converting section 33, the signal processing circuit 32, and the radio processing circuit 31.

A CPU (controller) 1 performs control of both of the telephone function section 30 and the digital broadcast receiving section 20. Specifically, for example, with respect to the telephone function section 30, when the phone's silent mode is set, a process of stopping output of a ring tone sound or ring tone melody is performed. The phone's silent mode is a mode in which output of sound is stopped and a vibration function and the like may be or may not be performed. The phone's silent mode is performed, for example, when a performance instruction is made by the user or when, in the case where a certain hour is set in advance, the hour comes. In addition, when an ON operation is performed on a television function activation key of an operation key section 2, the CPU 1 performs a process of providing an ON instruction to the digital broadcast receiving section 20. Furthermore, when a numeric keypad of the operation key section 2 is operated, the CPU 1 performs, for example, a process of providing a channel selection instruction with the operated number being a channel number, to the digital broadcast receiving section 20. A power supply circuit 5 supplies power obtained from a battery 4, to the telephone function section 30 and the digital broadcast receiving section 20.

Next, the digital broadcast receiving section 20 will be described. A terrestrial antenna 21 provides a signal received thereby to a terrestrial digital tuner 22. The terrestrial digital tuner 22 extracts a signal of a specific frequency from a high-frequency digital modulated signal containing video and audio data. In addition, the terrestrial digital tuner 22 includes a demodulator circuit, a deinterleave circuit, and an error correction circuit, or the like and demodulates a selected digital modulated signal, outputs a transport stream, and provides the transport stream to a demultiplexer (DEMUX) 23.

The demultiplexer (DEMUX) 23 demultiplexes the transport stream into a video stream, an audio stream, closed-caption-related data, PSI/SI (Program Specific Information/Service Information), and the like, in H.264 or the like in IEEE. The demultiplexer 3 supplies the video stream and the audio stream to an H.264 decoder 24 and supplies the PSI/SI (program information) to the CPU 1. The CPU 1 stores the program information in a memory 3. Note that the closed-caption-related data is composed of closed caption management data and closed caption (text) data. ARIB (Association of Radio Industries and Business) TR-B14 specifies that the closed caption management data and closed caption data indicate that closed captions are present in a stream. It is basic that a closed caption text is displayed after closed caption management data and closed caption data are received; however, even without receiving closed caption management data, display of closed captions is possible at the point in time where closed caption data is received. Of course, standards other than ARIB standards may be adopted.

The H.264 decoder 24 includes a video decoder that performs decoding on the video stream. The video decoder decodes an inputted encoded signal to obtain a quantized coefficient and a motion vector and performs, for example, an inverse DCT (Discrete Cosine Transform) and motion compensation control based on the motion vector, and thereby generates video data. The video data is supplied to a display (e.g., a liquid crystal panel) 27. Audio data is converted into an audio signal by an AAC (Advanced Audio Coding) decoder 28. The audio signal is supplied to a speaker 29.

The memory (a RAM, a ROM, a flash memory, an EEPROM (Electronically Erasable and Programmable Read Only Memory), etc.) 3 stores various operating programs, the aforementioned program information, various setting information (e.g., various selection information for the phone's silent mode setting), and the like.

In addition, in the digital broadcast receiving section 20, an earphone connector 25 is provided. By inserting a plug of an earphone into the earphone connector 25, the audio signal is supplied to the earphone through the earphone connector 25. Also, the earphone connector 25 supplies, when the plug of the earphone is inserted thereinto, a connection detection signal (a predetermined voltage value, or the like) to the CPU 1.

Next, a television silent mode relating to the present invention will be described.

(1) When the phone's silent mode is set in a television watching state, the CPU 1 determines that it is a television silent mode. Similarly, also when an ON operation is performed on the television function activation key in a state where the phone's silent mode is set, the CPU 1 determines that it is the television silent mode. Of course, it is also possible to select on a menu screen a setting in which even when the phone's silent mode is set it is not the television silent mode. The phone's silent mode is, as described above, a mode in which output of a ring tone is stopped.

(2) When the CPU 1 determines that it is the television silent mode, the CPU 1 causes the digital broadcast receiving section 20 to perform a television audio mute process. When the audio mute process is performed, the CPU 1 may perform a process of displaying on the display 27 a message or icon (pictogram) indicating that it is an audio mute mode. The message may be cleared when a predetermined period of time has elapsed since the display is performed. Display of the message or icon can be performed using an OSD circuit (on-screen display circuit) which is not shown.

(3) In addition to the audio mute process, the CPU 1 causes the display 27 to display closed caption characters when there is closed caption data in a received broadcast. Even when a setting on the side of the digital broadcast receiving section 20 is a setting of non-display of closed caption characters, closed caption characters may be compulsorily displayed. Note that when a setting on the side of the digital broadcast receiving section 20 is a setting "non-display of closed caption characters (non-display even when in the television silent mode)", closed caption characters may not be displayed. Of course, when a setting on the side of the digital broadcast receiving section 20 is a setting "non-display of closed caption characters (display when in the television silent mode)", closed caption characters are automatically displayed. These various settings can be performed on the menu screen. Alternatively, the CPU 1 may display on the display 27 a message asking whether it is all right to display closed caption characters, and when a user's intention in which it is all right to display closed caption characters is confirmed, closed caption characters may be displayed. For example, the message is displayed such as "Display closed captions? Press "1" for YES or "2" for NO".

(4) When closed caption characters are displayed in the above-described manner, there are closed caption display caused by a normal (not the television silent mode) operation and closed caption display caused by the television silent mode. To distinguish between them, i.e., to let the user know whether it is normal closed caption display or closed caption display resulting from audio mute (resulting from the television silent mode), icons for distinguishing between them may be displayed on the display 27. Alternatively, as shown in FIGS. 3A and 3B, the distinction may be made by differentiating colors, types of lines, or the like, of a frame of the closed caption display area or changing background colors of the closed caption area or colors of the closed caption characters.

(5) When the CPU 1 receives the connection detection signal (signal indicating that a plug of the earphone is inserted into the earphone connector 25), the CPU 1 terminates the mode of the closed caption display resulting from the audio mute (resulting from the television silent mode) (the closed caption display area is cleared). Furthermore, the CPU 1 terminates the mode of audio mute (terminates the television silent mode) and supplies the audio signal to the earphone connector 25. Note that when, in this state, the user opens the menu screen and selects YES for the option of "closed caption display", the closed caption display may be resumed. The closed caption display in this case is the normal closed caption display shown in FIG. 3A. When the setting on the side of the digital broadcast receiving section 20 is a setting that "even when an earphone is connected, the mode of closed caption display continues", the mode of closed caption display continues. Of course, it is also possible that only when a setting that "closed caption display is terminated when an earphone is connected" is selected on the side of the digital broadcast receiving section 20, closed caption display is terminated. Alternatively, the CPU 1 may display on the display 27 a message asking whether it is all right to terminate the mode of closed caption display and when a user's intention in which it is all right to terminate the mode of closed caption display is confirmed, the CPU 1 may terminate the mode of closed caption display.

When the user's intention is that the mode of closed caption display should not be terminated, it may be regarded as an instruction for continuing the closed caption display as the normal closed caption display. In this case, the basic setting for closed caption display itself may be automatically changed to a setting that "when there are closed captions in a television broadcast, closed captions are displayed". In a case where the icon for the distinction has been displayed on the display 27, the display process for the icon terminates. Similarly, in a case where the mode of closed caption display continues as the normal closed caption display, if a difference has been made in the color, type of lines, or the like, of the frame of the closed caption display area for the distinction, the color, type of lines, or the like, of the frame of the closed caption display area is brought back to the color, type of lines, or the like, of a frame for the normal closed caption display.

(6) When closed caption display resulting from the audio mute mode is terminated due to the connecting of an earphone, in the case where the icon for the distinction has been displayed on the display 27, the CPU 1 causes the icon to be hidden.

(7) When the phone's silent mode is terminated, the CPU 1 also terminates the television silent mode. Of course, it is also possible to cancel the television silent mode itself by, e.g., operating a button for cancelling the television silent mode. When terminating the television silent mode, the CPU 1 terminates the mode of television audio mute to output television sound from the speaker 29 and returns the state resulting from the audio mute (state resulting from the television silent mode) to the state before the audio mute is performed. Note that when the television silent mode terminates in an earphone connection state, the state in which television sound is outputted from the earphone is maintained.

(8) In a case where the closed caption display has been performed resulting from the audio mute, when the television silent mode is terminated, the CPU 1 terminates the mode of closed caption display (clears the closed caption display area). In a case where the icon for the distinction has been displayed on the display 27, the icon is caused to be hidden. The CPU 1 may display on the display 27 a message asking for permission to terminate the mode of closed caption display, and when given permission by the user, the CPU 1 may terminate the mode of closed caption display.

FIG. 2 is a flowchart showing an example of closed caption display control for the television silent mode. First, the CPU 1 determines whether the television silent mode has been set (step S1). The television silent mode is set, as described above, in conjunction with the phone's silent mode. If the television silent mode is not set, then the CPU 1 terminates the closed caption display control, and if the television silent mode is set, then the CPU 1 determines whether an automatic closed caption display setting is enabled (step S2). If the automatic closed caption display setting is not enabled, then the CPU 1 terminates the closed caption display control. If the automatic closed caption display setting is enabled, then the CPU 1 refers to information in a PMT (Program Map Table) (step S3). Subsequently, the CPU 1 determines whether there is a description on closed captions in the PMT (step S4). If there is no description on closed captions in the PMT, then the CPU 1 terminates the closed caption display control.

If there is a description on closed captions in the PMT, then the CPU 1 displays a message asking the user for permission to display the closed captions (step S5) and determines whether the user has permitted it (step S6). If the user does not permit it, then the CPU 1 terminates the closed caption display control. If the user has permitted it, then the CPU 1 determines whether the earphone is connected (step S7). If the earphone is not connected, then the CPU 1 determines whether the television silent mode has been terminated (step S8) and if the television silent mode has not been terminated, then the CPU 1 displays the closed captions (step S9). Note that in the closed caption display in this case, the CPU 1 displays an icon (icon for distinction) indicating automatic closed caption display. Alternatively, instead of the icon display or together with the icon display, the color, lines, or the like, of a frame of the closed caption display area may be changed.

If it is determined in step S7 that the earphone is connected, then the CPU 1 displays a message asking the user for permission to terminate the closed caption display mode (step S10). In the case where the icon for distinction has been displayed, when the above-described end permission message is displayed, the display state of the icon for distinction may be terminated. Then, the CPU 1 determines whether the user has agreed to terminate the closed caption display mode (step S11).

If the user does not agree to terminate the closed caption display mode, then the CPU 1 determines whether the phone's silent mode has been canceled (step S12) and if the phone's silent mode has not been canceled, then the CPU 1 continues the mode of closed caption display (step S13). Based on an idea that the closed caption display in this case is different from the closed caption display resulting from performing the television silent mode, it may be regarded as a normal closed caption display mode having been selected and thus the color, type of lines, or the like, of the frame of the closed caption display area may be returned to that in the normal state. If it is determined in step S12 that the silent mode has been canceled, then the CPU 1 determines whether it is the closed caption display state (step S15). If in step S11 the user has agreed to terminate the closed caption display mode, then the CPU 1 terminates the process for closed caption display (step S19) and determines whether the silent mode has been canceled, and if the silent mode has been canceled, then the CPU 1 determines whether it is the closed caption display state (step S15). Note that when it is determined in step S8 that the silent mode has been canceled, the processing also proceeds to step S15.

If it is determined in step S15 that it is not the closed caption display state, then the CPU 1 terminates the closed caption display control. If it is determined that it is the closed caption display state, then the CPU 1 displays a message asking for permission to terminate the mode of closed caption display (step S16). In the case where the icon for distinction has been displayed, when the above-described end permission message is displayed, the display of the icon for distinction may be terminated. Then, the CPU 1 determines whether the user has agreed to terminate the closed caption display mode (step S17). If the user does not agree to terminate the closed caption display mode, then the CPU 1 continues displaying the closed captions (step S18) and terminates the control of display of the closed caption. Based on an idea that the closed caption display in this case is different from the closed caption display resulting from performing the television silent mode, it may be regarded as the normal closed caption display mode having been selected and thus the color, type of lines, or the like, of the frame of the closed caption display area may be returned to that in the normal state. When given permission by the user to terminate the display of closed captions, the CPU 1 terminates the mode of closed caption display (step S20) and terminates the control of display of the closed caption.

Although digital broadcasting is received in the above-described embodiment, the configuration may be such that analog TV broadcasting is received or both of them are received. Note that for analog TV broadcasting, the above-described process for closed caption display is omitted.

BRIEF DESCRIPTION OF THE DRAWINGS

FIG. 2 is a flowchart showing processing contents according to the embodiment of the present invention.

Figure 1:
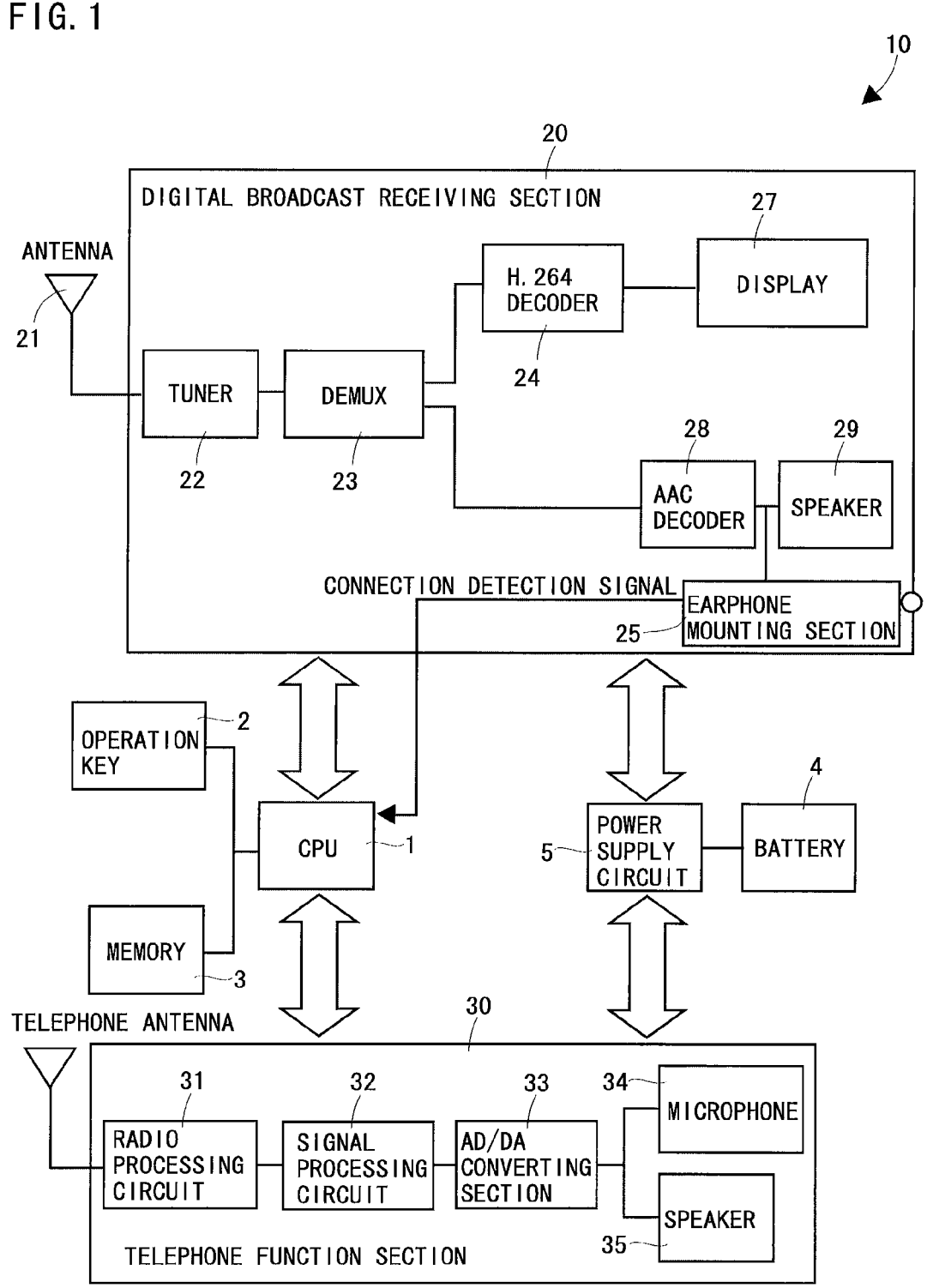
FIG. 1 is a block diagram showing a mobile phone with a TV function (mobile communication terminal having broadcast reception function) according to an embodiment of the present invention.
Figure 3A:
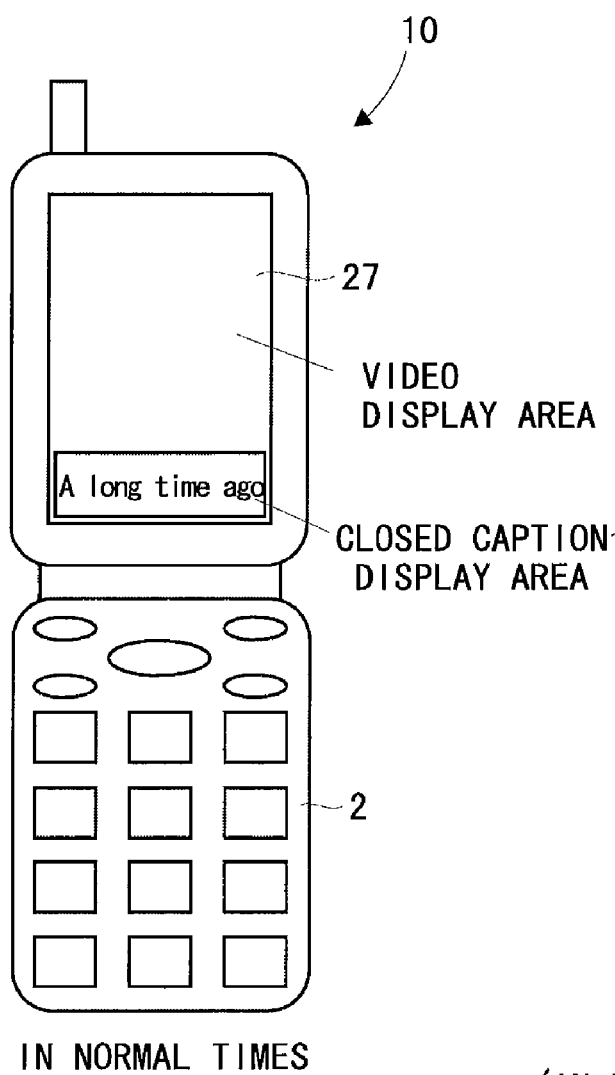
FIG. 3A is a diagram showing the embodiment of the present invention and is an illustrative diagram for describing a frame line of a closed caption display area for normal closed caption display.
Figure 3B:
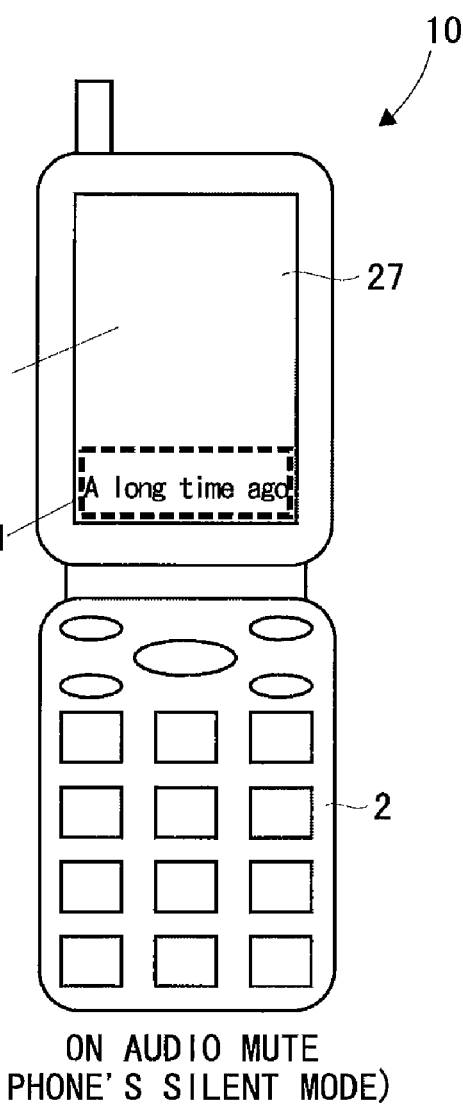
FIG. 3B is a diagram showing the embodiment of the present invention and is an illustrative diagram for describing a frame line of a closed caption display area for closed caption display on audio mute.

The invention claimed is:

1. A mobile terminal with cellular and broadcast reception, audio muting and closed captioning, comprising:
   a broadcast receiving function section for receiving a television broadcast;
   a wireless telephone function section for making a call by radio; and
   a controller that controls the function sections and performs display control on a display, wherein
   the broadcast receiving function section has an audio mute function and is configured to receive a digital broadcast and to perform closed caption display,
   the wireless telephone function section has a silent mode function, and
   when the silent mode is performed in the wireless telephone function section, the controller causes the broadcast receiving function section to perform the audio mute and causes the broadcast receiving function section to perform the closed caption display when causing the broadcast receiving function section to perform the audio mute, wherein the controller performs one of icon display and differentiating the display mode of a closed caption display portion between closed caption display resulting from the audio mute and normal closed caption display, for enabling a user to distinguish between the closed caption display resulting from the audio mute and the normal closed caption display.

2. The mobile terminal with cellular and broadcast reception, audio muting and closed captioning according to claim 1, wherein the controller performs control to cause, when the silent mode is performed in the wireless telephone function section, the broadcast receiving function section to perform the audio mute, in the case where the control is permitted by a user setting.

3. The mobile terminal with cellular and broadcast reception, audio muting and closed captioning according to claim 1, wherein the closed caption display is performed when the display is permitted by a user setting.

4. The mobile terminal with cellular and broadcast reception, audio muting and closed captioning according to claim 1, further comprising an earphone connector, wherein
when an earphone is connected or when an earphone is being connected, the controller terminates the mode of the audio mute and causes sound to be outputted from the earphone.

5. The mobile terminal with cellular and broadcast reception, audio muting and closed captioning according to claim 1, further comprising an earphone connector, wherein
when an earphone is connected or when an earphone is being connected, the controller terminates the mode of the audio mute and causes sound to be outputted from the earphone, and terminates the mode of the closed caption display adopted based on the audio mute.

6. The mobile terminal with cellular and broadcast reception, audio muting and closed captioning according to claim 1, further comprising an earphone connector, wherein
when an earphone is connected or when an earphone is being connected, the controller terminates the mode of the audio mute and causes sound to be outputted from the earphone, and displays a message asking for permission to terminate the mode of the closed caption display adopted based on the audio mute, and when a user performs an operation to agree to terminate the mode of the closed caption display, the controller terminates the mode of the closed caption display, and when the user performs an operation to disagree to terminate the mode of the closed caption display, the controller continues the mode of the closed caption display.

7. The mobile terminal with cellular and broadcast reception, audio muting and closed captioning according to claim 1, further comprising an earphone connector, wherein
when an earphone is connected or when an earphone is being connected, the controller terminates the mode of the audio mute and causes sound to be outputted from the earphone, and displays a message asking for permission to terminate the mode of the closed caption display adopted based on the audio mute, and when a user performs an operation to agree to terminate the mode of the closed caption display, the controller terminates the mode of the closed caption display, and when the user performs an operation to disagree to terminate the mode of the closed caption display, the controller continues the mode of the closed caption display and returns, when continuing the mode of the closed caption display, display in which the distinction is made to display in which the distinction is not made.

8. The mobile terminal with cellular and broadcast reception, audio muting and closed captioning according to any one of claims 1, 2, 3, 4, 5, 6, or 7, wherein not only when the silent mode of the wireless telephone function section is terminated but also when an independent operation to terminate the audio mute is performed, the controller terminates the mode of the audio mute and returns a state resulting from the audio mute to a state before the audio mute is performed.

9. A mobile terminal with cellular and broadcast reception, audio muting and closed captioning, comprising:
a broadcast receiving function section for receiving a television broadcast;
a wireless telephone function section for making a call by radio; and
a controller that controls the function sections and performs display control on a display, wherein
the broadcast receiving function section has an audio mute function and is configured to receive a digital broadcast and to perform closed caption display,
the wireless telephone function section has a silent mode function, and
when the silent mode is performed in the wireless telephone function section, the controller causes the broadcast receiving function section to perform the audio mute displays a message asking for permission to perform the closed caption display before causing the broadcast receiving function section to perform the audio mute, and when a user performs an operation to agree to the closed caption display, the controller causes the broadcast receiving function section to perform the closed caption display, and when the user performs an operation to disagree to the closed caption display, the controller does not cause the broadcast receiving function section to perform the closed caption display, wherein the controller performs one of icon display and differentiating the display mode of a closed caption display portion between the closed caption display resulting from the audio mute and the normal closed caption display.

10. The mobile terminal with cellular and broadcast reception, audio muting and closed captioning according to claim 9, wherein the controller performs control to cause, when the silent mode is performed in the wireless telephone function section, the broadcast receiving function section to perform the audio mute, in the case where the control is permitted by a user setting.

11. The mobile terminal with cellular and broadcast reception, audio muting and closed captioning according to claim 9, further comprising an earphone connector, wherein
when an earphone is connected or when an earphone is being connected, the controller terminates the mode of the audio mute and causes sound to be outputted from the earphone.

12. The mobile terminal with cellular and broadcast reception, audio muting and closed captioning according to claim 9, further comprising an earphone connector, wherein when an earphone is connected or when an earphone is being connected, the controller terminates the mode of the audio mute and causes sound to be outputted from the earphone, and terminates the mode of the closed caption display adopted based on the audio mute.

13. The mobile terminal with cellular and broadcast reception, audio muting and closed captioning according to claim 9, further comprising an earphone connector, wherein when an earphone is connected or when an earphone is being connected, the controller terminates the mode of the audio mute and causes sound to be outputted from the earphone, and displays a message asking for permission to terminate the mode of the closed caption display adopted based on the audio mute, and when a user performs an operation to agree to terminate the mode of the closed caption display, the controller terminates the mode of the closed caption display, and when the user performs an operation to disagree to terminate the mode of the closed caption display, the controller continues the mode of the closed caption display.

14. The mobile terminal with cellular and broadcast reception, audio muting and closed captioning according to any one of claims 9 to 13, wherein not only when the silent mode of the wireless telephone function section is terminated but also when an independent operation to terminate the audio mute is performed, the controller terminates the mode of the audio mute and returns a state resulting from the audio mute to a state before the audio mute is performed.

* * * * *